Sept. 17, 1935.　　　　　P. A. VOIGT　　　　　2,014,419
MULTIPLE UNIT WALL ASSEMBLY
Filed Oct. 21, 1931　　　2 Sheets-Sheet 1
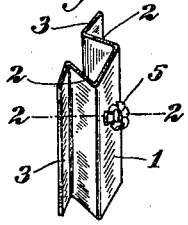
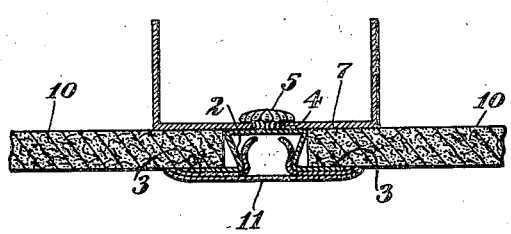
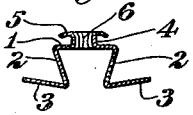
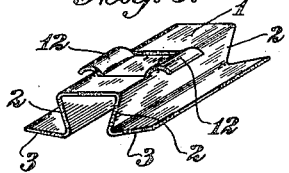
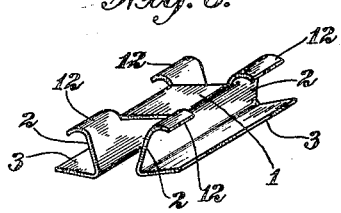
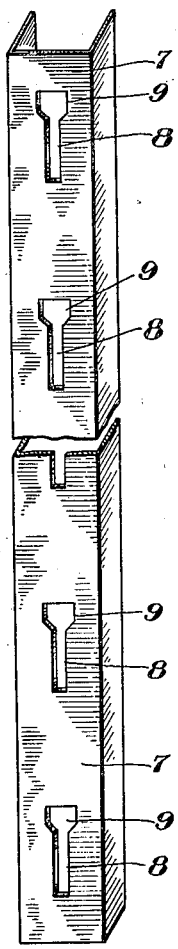
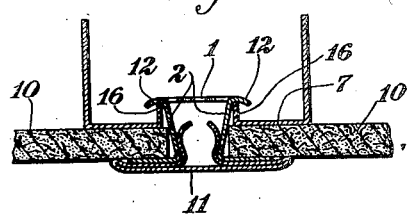
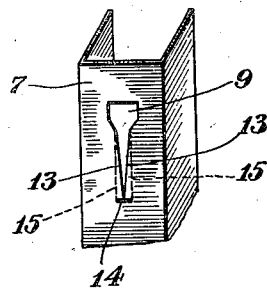
INVENTOR
Paul A. Voigt.
BY
ATTORNEY Sept. 17, 1935. P. A. VOIGT 2,014,419
MULTIPLE UNIT WALL ASSEMBLY
Filed Oct. 21, 1931
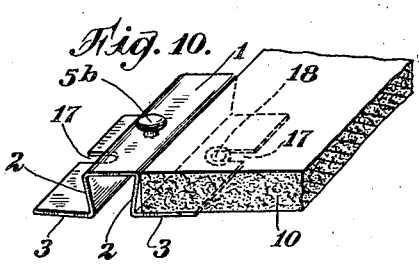
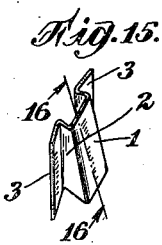
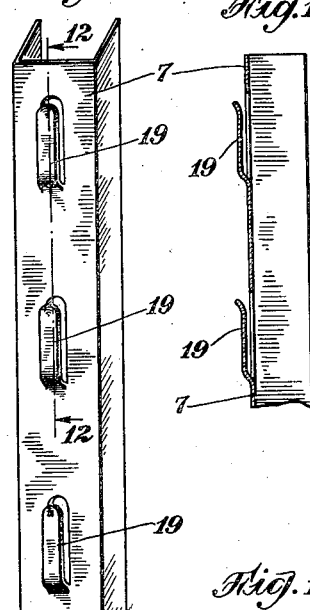
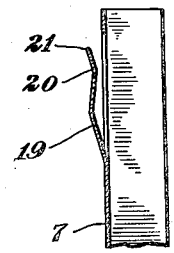
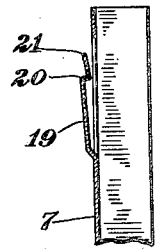
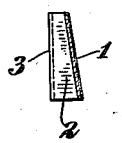
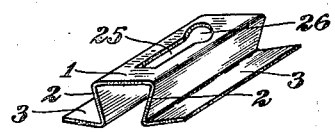
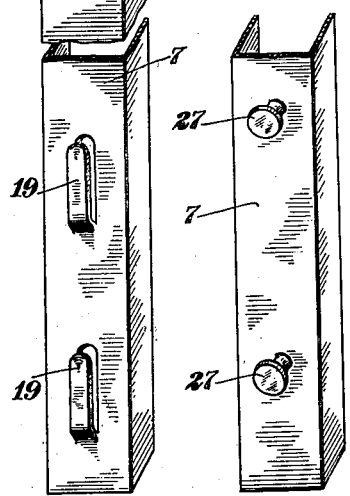
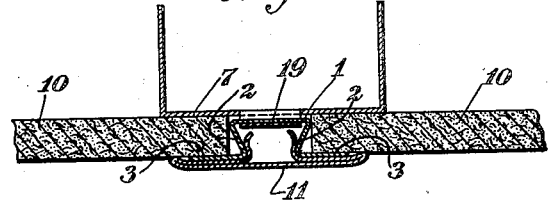
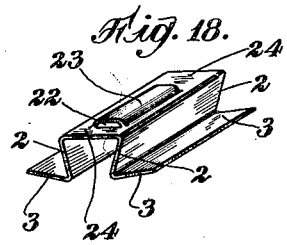
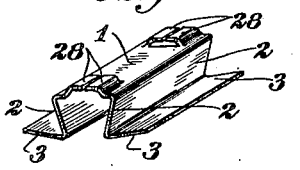
INVENTOR
Paul A. Voigt.
BY
ATTORNEY Patented Sept. 17, 1935

2,014,419

UNITED STATES PATENT OFFICE 2,014,419

MULTIPLE UNIT WALL ASSEMBLY

Paul A. Voigt, Ozone Park, N. Y., assignor to Johns-Manville Corporation, New York, N. Y., a corporation of New York Application October 21, 1931, Serial No. 570,109

5 Claims. (Cl. 72—118)

This invention relates to a multiple-unit wall assembly and particularly to one in which clips are engaged in securing means on metal supports or studding. The invention pertains especially to a combination of a clip provided with a base portion adapted to engage slideably securing means on the face of a metal support and a metal support providing such securing means, as in the form of a slot or tongue.

A purpose of the invention is to provide a multiple-unit assembly suitable for use as a side wall or partition of a building.

Another purpose is to provide a clip, suitable for maintaining panels in a wall assembly, that has a base portion of the clip adapted to engage a tongue, slot, button or other securing means on a face of a metal support.

A further purpose is to provide metal supports, such as vertically placed channel-irons, with the faces thereof provided with securing means adapted to engage the base of the said clips.

Additional objects and advantages will appear from the detailed description which follows.

A method of assembling units of finishing material, hereinafter referred to as panels, is described in U. S. Patent 1,800,609 to Drake. Drake describes a wall assembly, in which panels are maintained in position by clips comprising a base portion, inclined or converging side portions, and flanges extending outwardly and slightly backwardly from the front edges of the side portions, as illustrated in several of his figures, as, for example, in his Fig 5. The base portion is secured to a support, such as a wooden substructure, by a nail or other conventional means.

The present invention contemplates an improvement over Drake and other structures in that there may be used a fireproof or metal substructure, such as one of steel, an improved clip, and securing means in the substructure to which the base of the improved clip may be secured, preferably in a manner to leave the clip manually removable.

A preferred embodiment of the invention is illustrated in the drawings in which

Fig. 1 shows a perspective view of a clip suitable for use in accordance with the present invention.

Fig. 2 shows a transverse cross-section of the clip on line 2—2 of Fig. 1.

Fig. 3 shows a perspective view of a channel-iron provided with slots or securing means in the front face thereof.

Fig. 4 shows a cross-section of an assembly including a channel-iron, a clip, panels in position between the face of the channel-iron and the flanges of the clip, and a snap-in strip, with web members held in position between the forward parts of the two side portions of the clip.

Fig. 5 shows in perspective a modification of the clip, in which a part of the base portion is cut out and turned back to form two outwardly extending flanges.

Fig. 6 shows in perspective another modification of the clip, in which two parts of the base portion are cut out and turned back, at either end, to form two pairs of laterally extending flanges.

Fig. 7 is a perspective view of a development of a modification of the securing means in the front face of the channel-iron.

Fig. 8 shows the same modification after finishing of the slot, by turning back the edges between the dotted line on either side of the slot and the edge shown in Fig. 7.

Fig. 9 shows a cross-section including a channel-iron with slot with turned-back edges, a clip, panels in position between the flanges of the clip and the face of the channel-iron, and a snap-in strip held in position between the front parts of the side portions of the clips.

Fig. 10 shows a perspective view of a modification of the clip.

Fig. 11 shows a perspective view of a channel-iron with a modified form of securing means, comprising tongues.

Fig. 12 shows a cross-sectional view on line 12—12 of Fig. 11.

Figs. 13 and 14 show cross-sectional views of channel-irons with modified shapes of the tongue members.

Fig. 15 is a perspective view of a form of clip with base or back portion adapted to engage a tongue illustrated in Figs. 11-14.

Fig. 16 shows a longitudinal cross-section on line 16—16 of Fig. 15.

Fig. 17 shows a cross-section of an assembly including a channel-iron with a tongue as the securing means, a clip with base portion engaging said tongue, panels in position between the face of the channel-iron and the flanges of the clip, and a snap-in strip with web members engaged between the side portions of the clip.

Fig. 18 shows in perspective a modification of a clip, the base portion of which is adapted to engage a tongue of a support member.

Fig. 19 shows a perspective view of a metal support the face of which is provided with a projection or button.

Fig. 20 shows a perspective view of a clip with slotted base portion adapted to engage a projection, such as a button, on the face of a support.

Fig. 21 shows a perspective view of a modified form of clip in which each end of the base portion is slitted longitudinally and pressed to form a pair of converging flanges at either end, suitably rearwardly disposed, as illustrated.

In the various figures, like reference characters refer to like parts.

The clip or fastening means comprises a back or base portion 1 that may be flat or have a plurality of points lying in a plane and is adapted to be held in alignment on the forward face of a metal support such as a slotted stud, inclined or converging side portions 2, and flanged front portions or flanges 3, projecting outwardly and suitably somewhat rearwardly from the forward edges of the side portions, the base portion being adapted to engage securing means on the supports. Thus the base portion may include an element or enlargement projecting from the said portion such as a cut and stamped out button-shaped member with neck 4 and head or shoulder 5 or it may include an attached button 5b. The neck may be tapered so as to increase in width towards the head and may be somewhat resilient or spring-like, due to the slits 6 therein, to adapt the neck to a tight engagement with the sides of a slot into which it is inserted in the finished wall, assembly.

The formed metal support such as a channel-iron has a face portion 7 provided with spaced vertical slots 8 arranged lengthwise of the said face portion, with an enlarged top thereof 9 to facilitate the insertion of the head of a button or projecting member on the back portion of a clip. The slot may be straight or tapered, becoming narrower towards the lower end, in order to adapt it to hold tightly the projecting member of the back portion of a clip after insertion of the latter into the slot.

Panels 10 of finishing material are maintained in position in the finished assembly by the clip, whereby the panel may be maintained slidably or adjustably, as illustrated in Figs. 4 and 9. This leaves an exposed channel or groove along the line of union, which channel or groove may be closed by the insertion of the snap-in strip 11, suitably of the type illustrated in the said patent to Drake, as, for example, in his Fig. 9.

In the modification of the clip shown in Fig. 5, the back portion of the clip is adapted for engagement with the securing means of the studding by cutting centrally and turning back the two flanges 12 which, after shaping, extend outwardly and somewhat forwardly from the edges of the said back portion. In the assembly these flanges are inserted through the large opening at the top of the slot in the support and are kept behind the edges of the slot while the clip is slid downward into position.

In the modification shown in Fig. 6, flanges are formed similarly by cutting and then turning back a part of the back portion of the clip. In this modification, however, two parts of the back portion are thus shaped into flanges 12, these parts being suitably at either end of the clip, to give two pairs of flanges for engagement in the slot of the support.

When it is desired to have a slot the side edges of which are wedge-shaped in longitudinal section the development shown in Fig. 7 may be resorted to. First the face of the channel-iron or support is cut along the heavy continuous lines in the face to form the slot 13 and the slit 14. Then the edges of the slot are turned back, the bending being done along the dotted lines 15, to give a slot as illustrated in Fig. 8 with vertical edges 16 that are wedge-shaped in longitudinal section.

An assembly comprising a channel-iron support with spaced slots having edges extending, on the rearward side, at an angle from the plane of the outer face of the stud, as, for example, wedge-shaped edges, adapted to tighten the engagement of a clip as the base of the clip is forced downward in the slot and to correct for unevenness of thickness of metal or other irregularity of the clip, is illustrated in Fig. 9. This assembly differs from that shown in Fig. 4 in that wedge-shaped edges of the slot engage the back portion of the clip and in the shape of the back portion of the clip.

For some purposes it is desirable that the flanges extending from the forward edges of the side portions of the clip should engage a union attached to the panels. Fig. 10 illustrates a modification of the clip suitable for this purpose, in which the flanges of the clip have notches 17 extending inwardly, from the outer edge of each flange, towards the side portions of the clip. There is shown also in Fig. 10 a partial assembly illustrating how the panel 10 with union 18, suitably a pin embedded at one end in the panel and provided at the other end with a neck and head, is supported by the clip, with the projecting end of the union engaged in the groove in the flange of the clip.

In a modification of the securing means on a face of a channel-iron or support, there is shown (particularly in Figs. 11–14 and in Fig. 17) a tongue 19 attached to the face of the channel-iron and suitably rising more or less vertically from its position of attachment to the face of the support. This tongue may be punched from the face of the channel-iron or welded thereto in such manner as to be connected at its lower end and to leave a slot behind it in the face of the channel-iron.

Also the tongue 19 may be given different shapes. Thus it may be sloped slightly away from the channel-iron over the greater part of its length, to facilitate wedging the base of the clip as the base of the clip is inserted behind the tongue and forced downward into position. Or the tongue may have a heel 20 suitably near the top of the tongue, the heel being spaced backwardly, with respect to a lower portion of the tongue, in such manner as to decrease the space between the heel and the slot in the channel-iron, as compared to the space immediately below; the heel increases the resistance to removal of a clip the base of which has been inserted into the space below the heel of the tongue. A tongue of this type may have a forwardly flaring upper end 21 adapted to facilitate the insertion of the base of the clip behind the tongue. Or the heel 20 of the tongue may form substantially a right angle with the lower relatively straight portion of the tongue to give what amounts to a lock adapted to hold in place the back portion of a clip inserted below the heel of the tongue.

The modified form of clip shown in Figs. 15 and 16 may have tapered side portions 2 becoming wider towards the end which is to be inserted first and a base portion 1 adapted to become engaged behind a tongue of a support. Or, the clip of type shown in Fig. 15 may have straight, i. e., not tapered side portions. It will be observed that in this type of clip there is no projection from the back portion, the back portion itself being adapted to slip behind a tongue projecting from a face of a support and thus to hold the clip in position.

In the modification of a clip illustrated in Fig. 18 there is shown a back portion of clip provided with a pocket 22. This pocket divides the back portion of the clip more or less into three parts, of which two parts may be offset in a forward or backward direction with respect to the third part, in such manner that a tongue on a face of a support may be inserted between two of such parts and the third part. As illustrated, the central portion 23 is displaced backwardly with respect to the two end portions 24, or in such manner that a tongue may be inserted in front of the rearwardly disposed member or central portion and back of the two end portions.

The base of the clip shown in Fig. 20 is provided with a longitudinal groove or slot 25, preferably with an enlargement 26 at one end. The face of the metal support (Fig. 19) is provided with a button 27 or other projection adapted to engage said groove or slot in the clip. In another modification, a member with two upstanding diverging wings may be united to or formed on the face of the support and engaged by longitudinal slits in the base of a clip.

In the modified form of clip shown in Fig. 21, rearwardly disposed converging flanges 28, one pair at either end of the back portion of the clip, provide means for engaging a tongue on the face of a metal support. The tongue is inserted in front of the said flanges and behind the rest of the base of the clip.

The method of practicing the invention should be evident from the preceding description of the drawings. It may be added, however, that in making a wall assembly according to the present invention there are first arranged upright supports, such as metal studs. These are spaced laterally at such distances as to receive the panels desired in the wall and the clips for engaging the edges of those panels. The faces of the studs are suitably provided at the place of fabrication with the securing means, as, for example, slots or tongues. These securing means may be spaced as desired in a vertical line along the face of channel-irons, for example, at 6 to 24 inch intervals, suitably on 8 to 12 inch centers. The panels are placed in position, with the side edges on the faces of the support members or channel-irons. Clips are then engaged in the securing means in the face of the upright supports and forced down until they are firmly seated and maintain the edges of the panels in position between the flanges of the clips and the faces of the supports. The panels, at their lower edges, may rest upon a firm support, such as the edge of a baseboard of a wall or the edge of a lower course of panels. The spaces between the side edges of the panels, or corresponding spaces that may be provided if desired between horizontal edges of panels, may be closed by a batten or snap-in strip, such, for example, as the kind described by Drake in the reference previously stated, or by a hydraulic cementing material, such as mortar, plaster, or Portland cement. When the joints are to be closed by a caulking material, the side portions of the clips may be not converging, that is, either parallel or diverging in a forward direction.

Many variations from the illustrative details that have been given may be made without departing from the scope of the invention. For example, the back portion of the clip adapted to engage securing means on a metal support may be provided with a modified rearwardly disposed member for making such engagement. Thus this rearwardly disposed member may consist of a button with head placed obliquely with respect to its neck, to give a spring effect, adapted to provide additional tightening means.

The flanged front portions of the clips adapted to engage panels may be of one of the types already described or may have a perforation adapted to engagement with a union, such as a rivet or eyelet, for firmly securing the clip at its flanged portion to the panel of the building material. Or, the flanges may be omitted from the clip, in which case the side portions of the clips may engage edges of panels. However, the clips with flanges have advantages in many types of construction.

The panels may consist of a usual type of building material, as for example, a composition comprising 85 per cent by weight of Portland cement and 15 per cent of asbestos in the form of a compressed and hardened tile, insulating cane fiber board, sheets of metal of such thickness as to maintain their shape, or a composite panel, such as one with the front portion of the cement and asbestos composition described above and a rear portion of a sound-absorbing or heat-insulating material such as a pad of mineral wool fibres. Preferably the construction is made of fireproof materials throughout, as of metal studdings, sheet metal clips, such as brass, and combustible or not readily ignitible panels.

It will be understood that the securing means on the face of the metal supports are adapted to engage slideably the base of the clips, that is, to engage the clips when the latter are placed in contact with the face of the support and are then slid or moved along the face of the support, in a direction more or less parallel to the face, until engaged by the securing means. A clip so engaged is manually removable, although tapping lightly with a tool may make easier the loosening of the clip from the position in which it is seated.

The words "to engage panels" are intended to include maintaining panels in position by a flange projecting over a front edge of a panel and holding the edge of the panel between the flange and a face of a support as well as other methods of securing a portion of a fastening member or fastening means to a panel. The term "clip" is used herein to illustrate a fastening member having a portion engaging or secured to a panel and another portion secured to or engaging the face of a support such as a stud.

What I claim is:

1. In a multiple-unit wall assembly including panels, supports therefor, and fastening means for securing the panels on the supports, the improvement comprising a preformed metal stud support, a face thereof provided with a plurality of spaced slots having edges extending on the rearward side at an angle from the plane of the outer face of the stud, and fastening means provided with a back portion engaged in one of the said slots, a base portion held tightly against the forward face of the stud, and a forward portion engaging a panel.

2. A multiple-unit wall assembly comprising in combination panels of finishing material, supports therefor, face portions of the supports provided each with spaced slots having edges with rearward side inclined with respect to the face of the support, and fastening means securing the panels to the supports, the fastening means including a back portion engaged in one of the said slots and a flanged front portion engaging the panels.

3. A multiple-unit wall assembly comprising in combination panels of finishing material, supports therefor, face portions of the supports provided each with spaced slots having greater width at the top than at the lower portion and having edges with rearward side inclined with respect to the face of the support, and clips securing the panels to the supports, the clips including each a rearwardly disposed button-like member engaged in one of the said slots and a flanged forward portion engaging a panel.

4. An elongated support provided with slots and adapted for use as a stud in a multiple-unit wall assembly including panels of finishing material and means engaging the edges of the said slots and securing panels to the support, the said support comprising a face portion provided with a plurality of the said slots in spaced relationship to each other and the said slots having rear portions inclined with respect to the face of the support, whereby tightness of engagement of the said means with the said edges is facilitated.

5. In a multiple-unit wall assembly including panels, supports therefor, and fastening means for securing the panels on the supports, the improvement comprising a stud support, a face thereof provided with a plurality of spaced slots having each an edge extending on the rearward side at an angle from the plane of the outer face of the stud, and fastening means provided with a back portion including an element thereon engaged in one of the said slots and with a forward portion engaging a panel.

PAUL A. VOIGT.